(No Model.) 4 Sheets—Sheet 3.
J. R. JOHNS.
ROTATING GRAIN WEIGHER.

No. 507,544. Patented Oct. 31, 1893.

WITNESSES
INVENTOR
Attorneys.

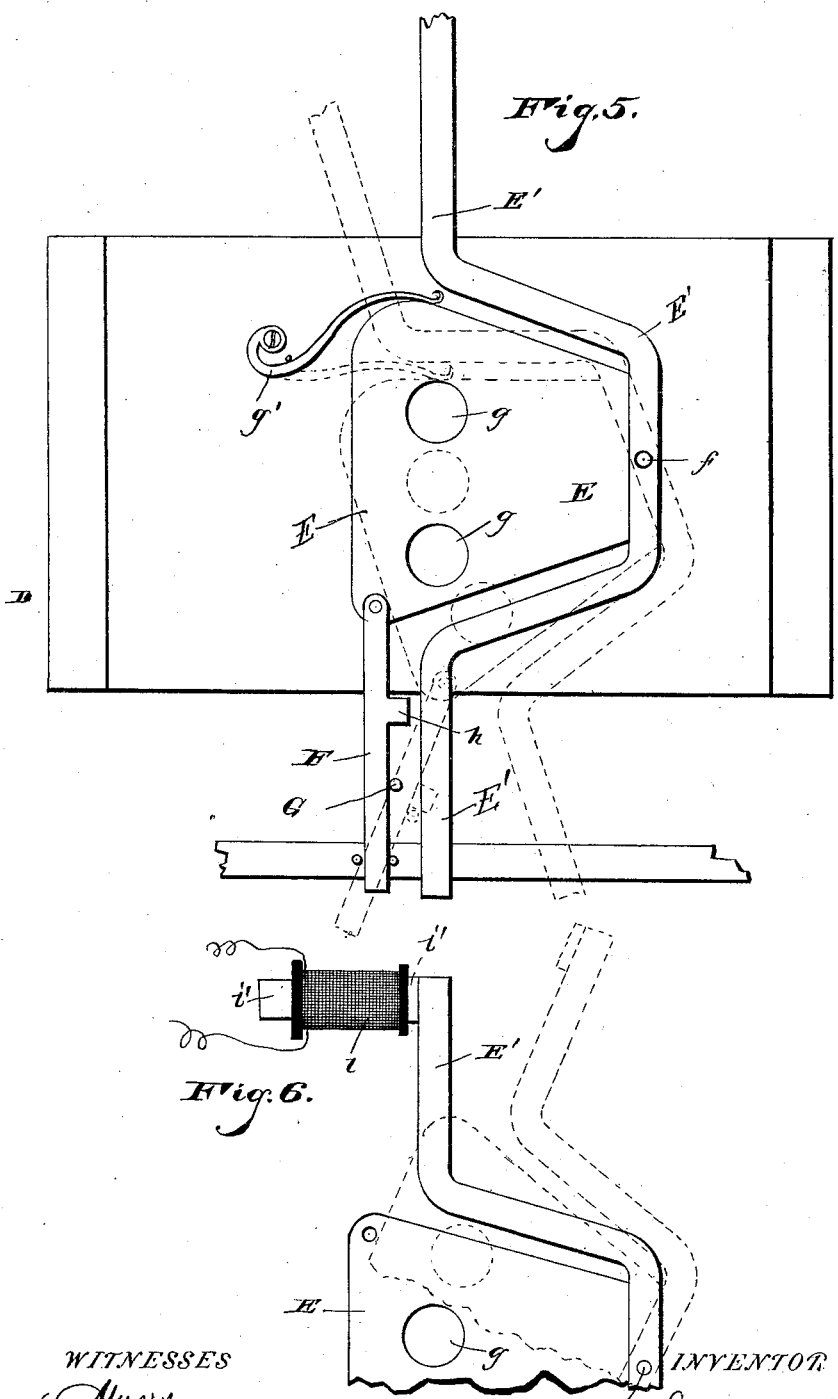

UNITED STATES PATENT OFFICE.

JACOB R. JOHNS, OF MILLERSBURG, PENNSYLVANIA, ASSIGNOR, BY MESNE ASSIGNMENTS, TO THE AUTOMATIC AND ELECTRIC SCALE COMPANY, OF NEW JERSEY.

ROTATING GRAIN-WEIGHER.

SPECIFICATION forming part of Letters Patent No. 507,544, dated October 31, 1893.

Application filed December 22, 1890. Renewed November 11, 1891. Serial No. 411,607. (No model.)

*To all whom it may concern:*

Be it known that I, JACOB R. JOHNS, a citizen of the United States of America, residing at Millersburg, in the county of Dauphin and State of Pennsylvania, have invented certain new and useful Improvements in Grain-Measurers, of which the following is a specification, reference being had therein to the accompanying drawings.

My invention relates to certain improvements in automatic grain scales, and it has for its object to effect magnetically or electrically the actuation of the feed opening slide, also to automatically trip and reset the measuring vessel or dump, and it consists mainly in providing means for carrying out the above objects in a simple and effective manner as hereinafter disclosed in the accompanying description and drawings and pointed out in the claims.

Figure 1:
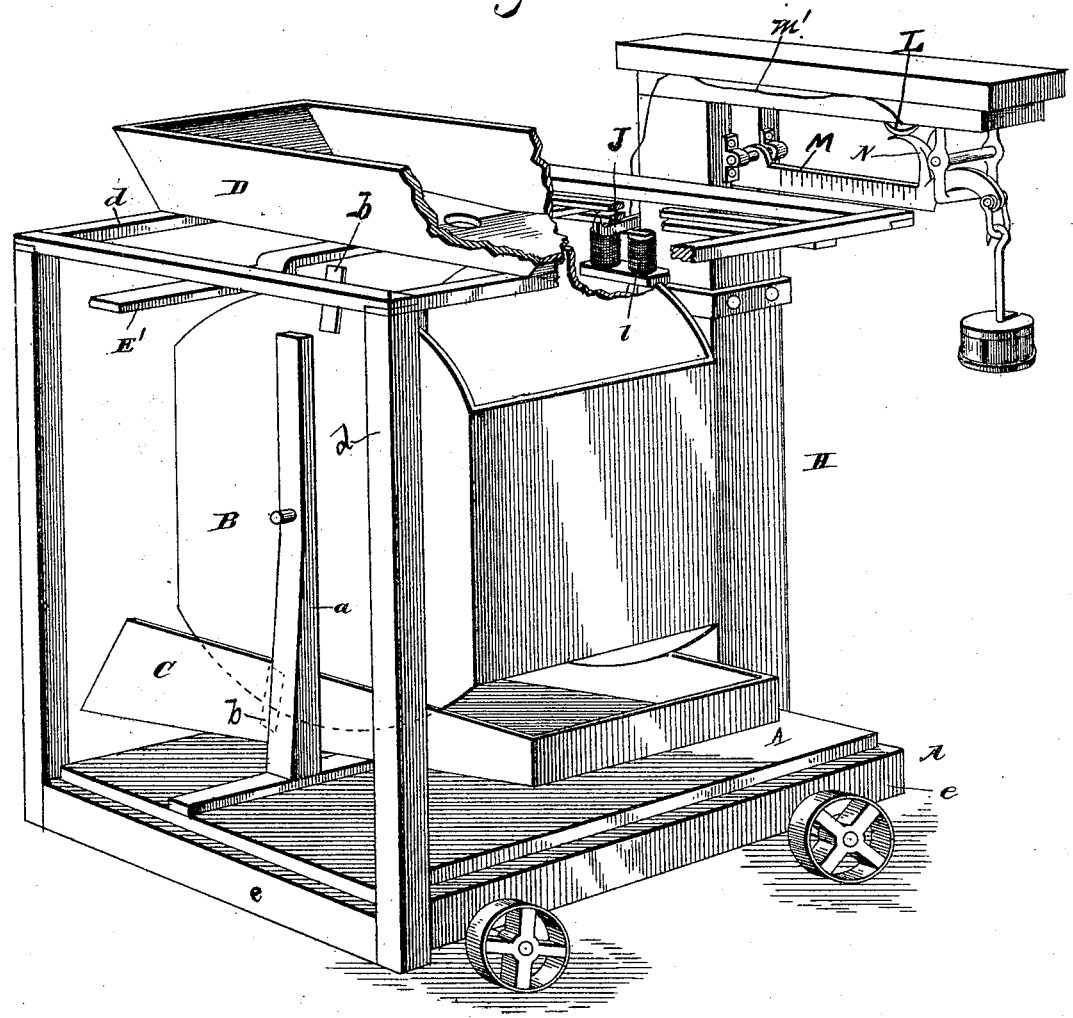
Figure 2:
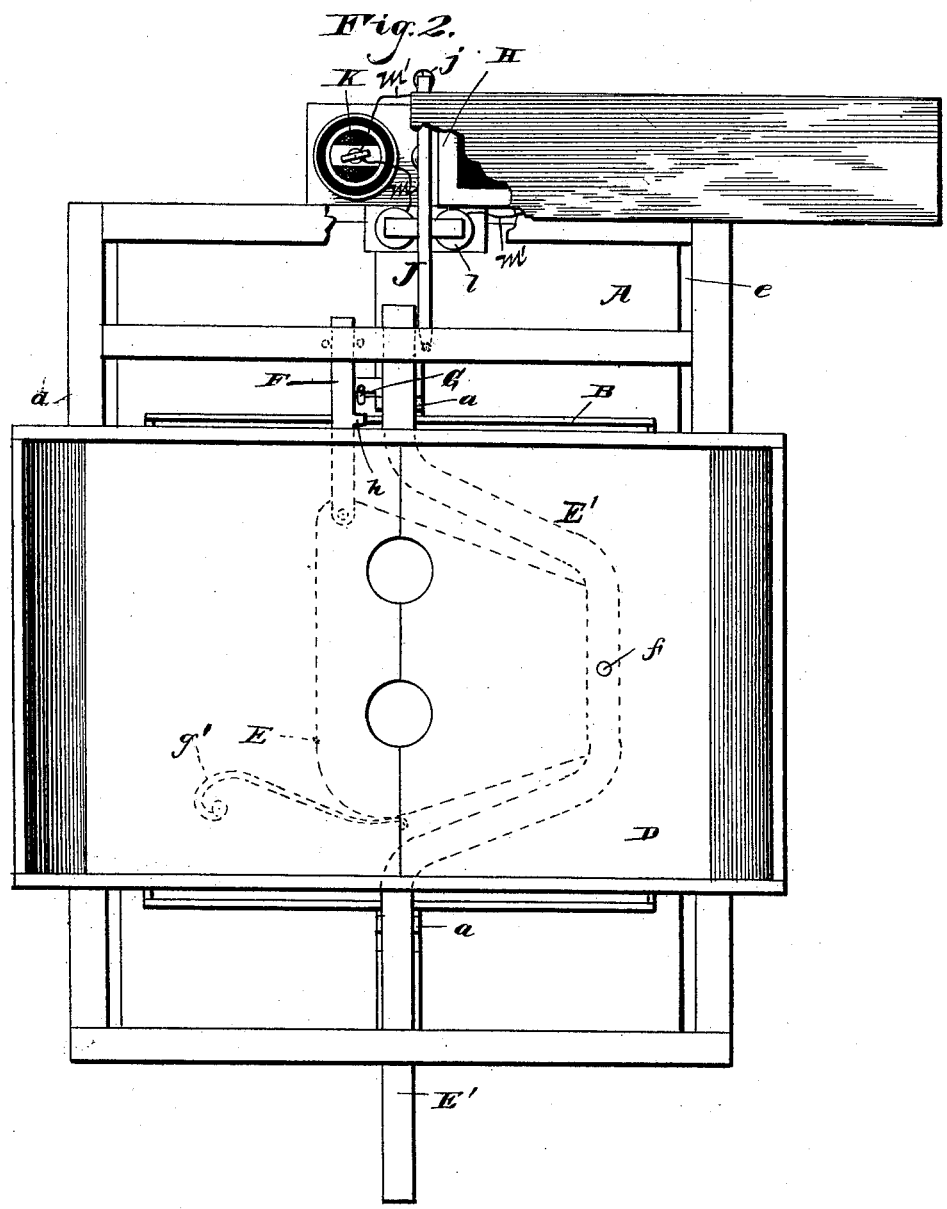
Figure 3:
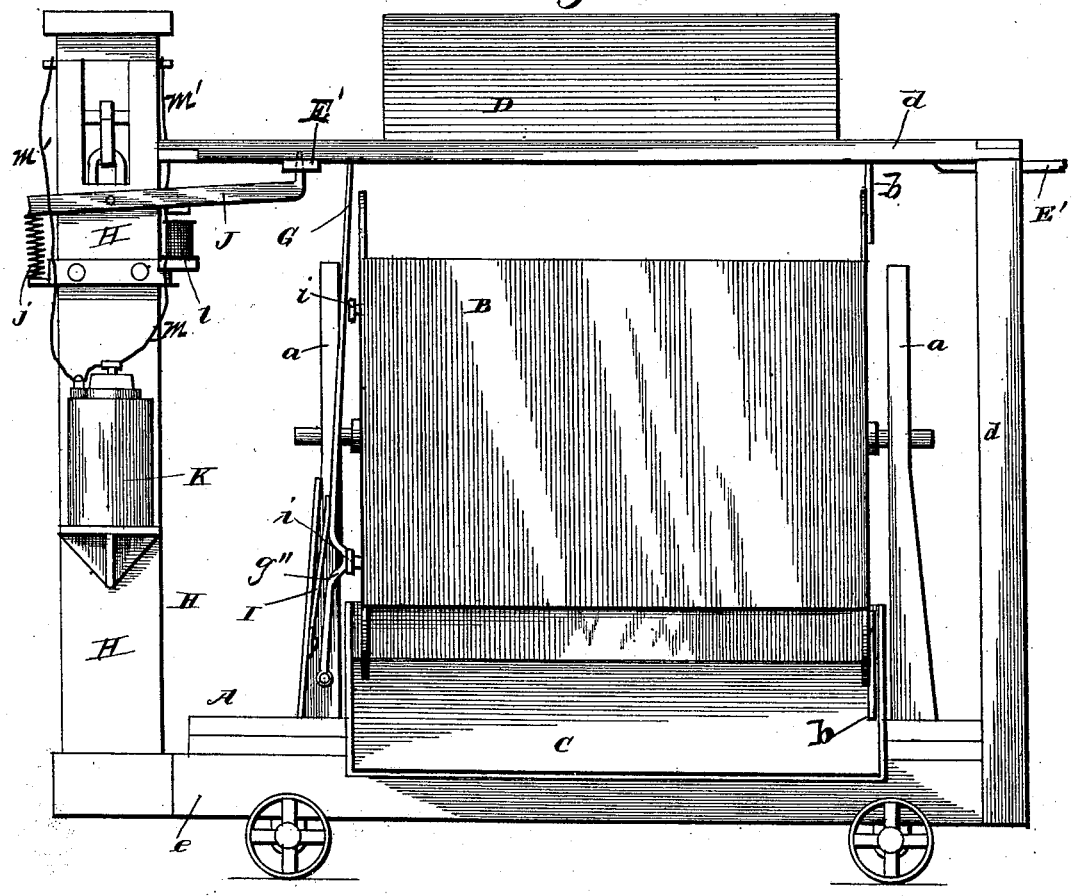
Figure 4:
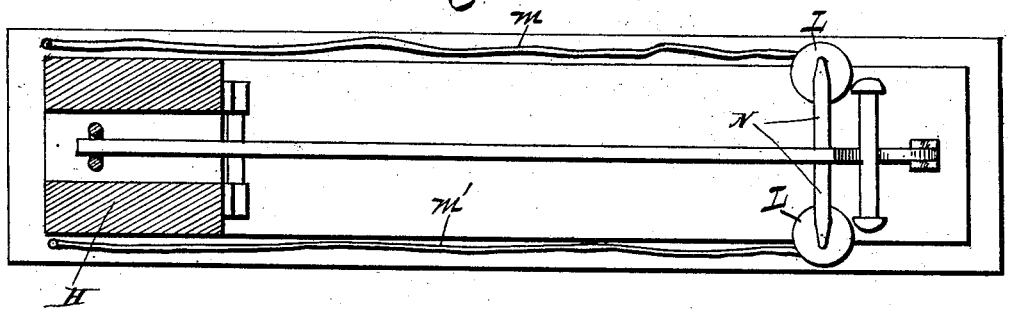

In the drawings: Figure 1 is a perspective view of my improved scales with portions broken away. Fig. 2 is a plan view of the same. Fig. 3 is a side elevation thereof. Fig. 4 is an inverted view of the scale beam support. Fig. 5 is an inverted view of a hopper, showing its feed slide and the actuating lever thereof and adjunctive parts of the same. Fig. 6 is a plan view showing a modification.

In the organization of my invention, I employ the usual platform scales A, and pivotally support, between uprights or standards $a\ a$ secured or bolted upon the scale platform, the measuring vessel or dump B having at each end upon one side, the feed slide resetting studs $b\ b$. The vessel or dump B in practice is diagonally partitioned off, as shown in the patent granted to P. R. Grabill, No. 403,748, to cause said vessel to rotate on its centers when the upper compartment is filled, but aside from the controlling means the mechanism forms no part of this invention.

D is the hopper suitably supported upon and within the upright frame $d$ bolted or otherwise secured to the stationary platform inclosing base $e$.

C is the chute rigidly mounted on the base $e$ in any suitable manner for the reception of the contents of the vessel or dump B when dumped.

E (Fig. 5) is the hopper feed slide centrally pivoted at one end, at $f$, to the under side of the bottom of the hopper, and having the usual feed openings $g\ g$ adapted to register with corresponding openings in said hopper bottom. The slide is closed or moved to cut off the grain by spring pressure, for which purpose a spring $g'$ is provided preferably mounted on the hopper bottom as shown in Fig. 5 and at one side the slide is provided with an actuating lever E' the arms of which project in opposite directions and serve to lock the movable vessel and reset and hold the slide as will presently appear. The slide E also has connected to it a second lever F, having a lateral lug $h$ adapted to strike or co-operate with the upper end of an upright lever G (Fig. 3) having, near its lower end, a bend or crook $g''$ adapted normally to lie in the path of a stud $i$ on the side of the vessel or dump B when the latter is in position to be filled. The lever F moves said lever G out and releases the stud as the slide closes thereby allowing the vessel to rotate and dump the grain. It will be understood that two studs $i$ are employed, one on each side of the center on which the vessel turns; hence the vessel is arrested with first one end up and then the other.

Secured to one of the standards $a$ is an outwardly bowed or bent spring I engaging the lever G to press it back in position to engage the stud $i$ when the slide is again opened.

J is an armature lever pivoted to one side of the standard H of the platform scales, and having one end upturned and adapted to stand in the plane of movement of the feed slide lever E', the upper end of the lever being inclined or beveled to permit the passage of the feed slide actuating lever upon its return movement. The opposite end of said lever J has connected to it a spring $j$ also connected to standard H to automatically hold the upper end of said lever in the plane of movement of the feed slide actuating lever, as just stated.

Suitably supported by bracket or otherwise, upon one side of the standard H is an electrical generator or battery K, and upon the inner side of said standard is an electro magnet, *l* adapted to engage or attract the lever J and arranged in electrical connection, by means of the wire *m*, with said battery. This wire also, together with a second wire *m'* leading from the battery extends along the side of the scale beam and terminates in contacts or electrodes L L secured to the under side of said support, which being of wood insulates them from each other.

The scale beam M has secured to or cast with it a metallic branch or bifurcated circuit maker and breaker N, its arms or branches being adapted to engage the contacts or electrodes L L and move them into contact with each other.

In operation, the measuring vessel or dump B, when filled with grain or other substance fed from the hopper, will through transmission of the weight of its contents by means of the standards supporting said vessel or dump, to the platform, depress the latter, causing the kicking of the scale beam. The upward movement or "kicking" of the scale beam will effect engagement of the circuit maker and breaker N, with the electrodes on the scale beam support, and establish or close the circuit causing the magnet to attract the armature lever J thus removing the latter out of the plane of movement of the feed slide lever and allowing said feed slide lever sufficient movement, under the action of its spring, to effect the closing of the feed opening in the hopper bottom, and thereby cut off the feeding of the grain or contents of the hopper to the measuring vessel or dump. The lever F, having the lug *h* thereon acting upon the lever G moves the latter outward compressing the spring I, and thus disengaged the crook *g''* from the stud *i* of the vessel or dump B and permitting it to discharge its contents into the chute C for final disposition. The weight having thus been removed from the platform and the scale beam consequently returned to its former position the circuit is broken and the armature lever released and returned to position to engage the cut-off lever. The vessel or dump makes a semi-rotation and the upper stud *b* thereon engages one arm of the feed-slide lever, and resets the feed slide as in said former patented device thus opening the feed orifice of the hopper to the other chamber of said vessel. Simultaneously with the resetting of the feed slide of the hopper by the upper end stud of the measuring vessel, the crook or bend of the lever G will under the action of its spring automatically snap into engagement with the stud on the measuring vessel or dump, to hold the dump in place, and the feed slide lever having been brought around to its original position by the action of the resetting stud, it will snap past the beveled end of the armature lever and thus be held, against the action of the spring *g'*, until the filling of the other chamber of the measuring vessel takes place and the kicking of the scale, again closing or establishing the circuit when the operations before described are again gone through with.

In Fig. 6 is illustrated a modified form of magnetically operated catch for holding the feed slide with the apertures open. It consists of a permanent magnet *i'* of sufficient strength to hold the arm E' when moved into contact therewith as shown in full lines, the position of the slide and lever then corresponding to the position shown in full lines Fig. 5. Surrounding the permanent magnet is a coil or helix *i* wound reversely or traversed by the current in such direction as to reduce or neutralize the power of the magnet hence when the circuit is established by the kicking of the scale beam the power of the magnet is instantly neutralized and the lever released permitting the slide to close under the influence of its spring.

Having thus fully described my invention, I claim—

1. In a scales for automatically weighing grain, the combination with the tilting measuring vessel having a resetting stud thereon, of the hopper, the spring pressed slide for cutting off the flow of grain, the arms or lever projecting from said slide actuated by the resetting stud on the vessel to reset the slide, and an electro magnetically controlled catch for holding the feed slide in set position with contacts controlled by the movement of the scale interposed in the magnet circuit; substantially as described.

2. The scales having the feed slide and its actuating lever, means for holding said lever and slide in their operative position, said slide having an additional lever, the tilting measuring vessel, having a stud and the lever adapted to engage said stud for its retention in place, substantially as described.

3. The scales having the spring pressed feed slide, the lever or arm connected therewith and the armature lever co-operating with the lever or arm on the feed slide, the tilting measuring vessel, having a locking stud and the spring pressed lever actuated by the feed slide and having a crook or bend adapted to engage said locking stud; substantially as described.

4. In a scales such as described, the combination with the movable measuring vessel having a locking stud or projection and the lever cooperating therewith to lock the vessel, of the spring pressed feed slide, a lever connected therewith cooperating with the locking lever to release the vessel and a catch for holding the feed slide, operated by the movement of the scales; substantially as described.

5. In a scales, such as described, the combination with the movable measuring vessel having a locking stud or projection and the lever cooperating therewith to lock the vessel, of the spring pressed feed slide a lever connected therewith cooperating with the locking lever to release the vessel and an electro-magnetically operated catch having its circuit controlled by the movement of the scales for holding the feed slide in set position; substantially as described.

6. In a scales, such as described, the combination with the movable vessel and spring pressed feed slide, of a lock for the vessel actuated by the feed slide and a re-setting lever for the feed slide actuated by the vessel, with means for releasing the feed slide actuated by the movement of the scales; substantially as described.

7. In a scales for automatically weighing grain, the combination with the movable measuring vessel and lock for holding the vessel in position, of the hopper, the feed slide closed by spring pressure and controlling the lock for the measuring vessel, the electro magnet, electric circuit included in said magnet and contact for establishing said circuit controlled by the scales, whereby the feed slide is released and in turn releases the measuring vessel; substantially as described.

8. In an automatic weighing scale, the combination with the movable measuring vessel, and lock therefor, of the hopper, the feed slide closed by spring pressure and controlling the lock for the vessel, the electro magnet energized by a circuit controlled by the scales to release said slide, and the lever actuated by the measuring vessel and cooperating with the feed slide to open the same as the vessel reaches normal position; substantially as described.

In testimony whereof I affix my signature in presence of two witnesses.

JACOB R. JOHNS.

Witnesses:
O. M. BALL,
J. A. HAGMANN.